United States Patent
Clarke et al.

[11] Patent Number: 5,877,798
[45] Date of Patent: Mar. 2, 1999

[54] METHOD AND APPARATUS FOR AUTOMATICALLY DETERMINING THE STYLE PRINTHEAD INSTALLED IN A LASER PRINTER

[75] Inventors: Cyrus Bradford Clarke; David Brian Langer; Phillip Byron Wright, all of Lexington, Ky.

[73] Assignee: Lexmark International Inc., Lexington, Ky.

[21] Appl. No.: 821,832

[22] Filed: Mar. 21, 1997

[51] Int. Cl.$^6$ .................................................... B41J 2/235
[52] U.S. Cl. ............................ 347/250; 347/260; 347/261
[58] Field of Search .................................... 347/238, 239, 347/250, 255, 256; 395/653, 185.04

[56] References Cited

U.S. PATENT DOCUMENTS

| | | | |
|---|---|---|---|
| 4,135,245 | 1/1979 | Kemplin et al. | 395/104 |
| 4,386,862 | 6/1983 | Kittel et al. | 400/144.2 |
| 4,709,245 | 11/1987 | Piatt | 347/49 |
| 4,716,421 | 12/1987 | Ozawa et al. | 347/14 |
| 4,779,104 | 10/1988 | Lawrence et al. | 346/139 R |
| 4,868,673 | 9/1989 | Negoro | 358/296 |
| 4,872,027 | 10/1989 | Buskirk et al. | 347/19 |
| 5,049,898 | 9/1991 | Arthur et al. | 347/19 |
| 5,049,904 | 9/1991 | Nakamura et al. | 347/19 |
| 5,363,134 | 11/1994 | Barbehenn et al. | 347/49 |
| 5,491,540 | 2/1996 | Hirst | 399/12 |
| 5,504,590 | 4/1996 | Kawada et al. | 358/403 |
| 5,541,637 | 7/1996 | Ohashi et al. | 347/248 |
| 5,696,685 | 12/1997 | Lee et al. | 395/653 |
| 5,710,721 | 1/1998 | Rieckhoff et al. | 395/185.04 |

*Primary Examiner*—N. Le
*Assistant Examiner*—Hai C. Pham
*Attorney, Agent, or Firm*—Ronald K. Aust; John J. McArdle, Jr.

[57] ABSTRACT

A laser printer is provided having an automatic printhead identification system for use in a family of laser printers that are compatible with more than one model of printhead. For example, a single laser printer model can be made so that two different printheads can be successfully used, so long as the printer system knows which laser printhead has actually been installed. To detect which printhead has been installed, the printer operating system provides a reference clock signal having a pre-determined frequency, which dictates the rotational speed of the motor. Once the motor has achieved a "lock" operational speed, the printer measures the scan rate of the faceted mirror by detecting the time interval between pulses of the "HSYNC" signal. The HSYNC signal is sent to a "divide-by-n counter" circuit which divides the pulse frequency of the HSYNC signal, thereby increasing the time interval (by a factor of "n") that must be sensed by the system to determine which printhead is in fact installed. So long as the HSYNC "lock" frequency is different between the various models of printheads that are compatible with a particular model laser printer, the principles of the invention can be used without adding any extra hardware sensors, signals, or memory addresses and detecting codes.

23 Claims, 3 Drawing Sheets

METHOD AND APPARATUS FOR AUTOMATICALLY DETERMINING THE STYLE PRINTHEAD INSTALLED IN A LASER PRINTER

TECHNICAL FIELD

The present invention relates generally to high-resolution laser printers and is particularly directed to a laser printer of the type which can automatically identify the type of printhead that has been installed into the printer. The invention is specifically disclosed as a laser printer that is compatible with more than one type of printhead, in which the printer can automatically determine which one of the compatible printheads has been installed by measuring the HSYNC signal timings within certain tolerances.

BACKGROUND OF THE INVENTION

Laser printers typically offer a greater improvement in resolution over dot matrix and ink jet-type printers, and the trend is to offer ever greater resolution in dots per inch (dpi), and to increase the throughput of pages printed per minute (PPM). In most cases, a particular family of conventional printers manufactured by a given manufacturer would always contain the same laser scanning unit (referred to as a "printhead"), and since there was only one type of available printhead, the print engine programming code (e.g., software or firmware) always assumed the correct printhead was installed in the printer. However, to reduce cost and reliance on a single vendor of printheads, it would be possible to make a laser printer compatible with more than one particular printhead model, although it would be very important to know which model printhead was actually installed within the printer.

Some conventional printers use an identification circuit on their printheads, such as in U.S. Pat. No. 5,363,134 (by Barbehenn). The printhead of an ink jet printer is disclosed as including an identification circuit on the same substrate as the jet array circuit. The identification circuit includes programmable pads that each include an active device (such as a diode or transistor) and programmable fuses. The identification circuit provides information about which type of ink jet cartridge has been installed, including information such as which color ink is included in this cartridge.

Another patent, U.S. Pat. No. 4,872,027 (by Buskirk), discloses a printhead used in a dotmatrix printer, in which the printhead includes extra pathways that can be connected to different resistors to provide a "code." The printer reads the code and can be automatically reconfigured accordingly, because the code represents the type of color of the printhead. Buskirk also discloses other means of identification of a printhead, such as the use of a projection or depression in the printhead that can be sensed by a limit switch, the use of a bar code reader, or some other type of optical reader that detects reflecting areas on the printhead.

U.S. Pat. No. 5,049,898 (by Arthur) discloses an ink jet printer in which the printhead includes a memory element that can be read by the printer. This memory element contains data used to identify the printhead, and can be used to identify the color of the printhead's ink, or some other parameter. Similarly, U.S. Pat. No. 5,504,590 (by Kawada) discloses a copier that can detect whether or not a correct operational panel is installed. A "code" is sent to a remote processing unit which provides information as to the type of display or other parameters of the operator panel. If an incorrect display is discovered by the processing unit, a message is provided on the display to warn the user that the operational panel should be changed.

U.S. Pat. No. 5,491,540 (by Hirst) discloses a printer or copier having a serial interface between the printer/copier and certain replacement parts. The interface allows information about use, calibration, or other parameters to pass to the replacement part from the printer, after the new part has been installed.

U.S. Pat. No. 5,868,673 (by Negoro) discloses a laser beam scanner with a regulator that keeps the scanning speed of the beams uniform in the "target" region. The scanning speed is controlled so as to produce a more precise printer, and this is accomplished by using a photo-sensor drum that is used to detect the rotational speed of a polygonal scanner that is mounted to the drive motor. Negoro assumes that the correct printhead or print engine has already been installed.

While conventional printers assume that the printhead that has been installed is of a certain known type, greater flexibility could be achieved by making the printer compatible with more than one style printhead. It would be beneficial to be able to detect whether or not the correct laser scanning unit or printhead has been installed into the laser printer without having to rely on additional sensors or other hardware that would both add complexity to the printer and add cost to manufacture.

SUMMARY OF THE INVENTION

Accordingly, it is a primary object of the present invention to automatically detect the type of laser printhead that has been installed within a laser printer in situations where more than one type or model of laser printhead is compatible with this particular printer.

It is another object of the present invention to automatically detect which type of laser printhead has been installed in a laser printer without having to provide additional sensors or other hardware elements, such as memory circuits to hold a particular code, so as to be able to detect one of a plurality of compatible laser printheads that can be installed within a particular model of laser printer.

It is a further object of the present invention to be able to use more than one different model of laser printhead within the print engine of a laser printer, and to use the frequency of its HSYNC signal as an indication as to which of these printhead models has been installed.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved laser printer is provided having an automatic printhead identification system in which more than one model of printhead can be installed in the same family of laser printers. In one laser printer model that has a speed range up to 24 pages per minute (PPM), two different printheads can be successfully used, so long as the printer system knows which laser printhead has actually been installed. To detect which printhead has been installed, the printer operating system measures the "lock" frequency of the printhead by detecting the time interval between pulses of the HSYNC signal at a given, common frequency of the input reference clock.

This HSYNC signal is a standard signal that is provided with the laser printer and is also used for other purposes. For example, in conventional laser printers, the HSYNC photosensor signal is used as feedback to synchronize the position of the laser with respect to the page. In the present invention, the HSYNC signal is sent to a "divide-by-n counter" circuit which divides the pulse frequency of the HSYNC signal, thereby increasing the time interval (by a factor of "n") that must be sensed by the system to determine which printhead is in fact installed. So long as the HSYNC "lock" frequency is different between the various models of printheads, for a given, common frequency of the input reference clock, that are compatible with a particular model laser printer, the principles of the invention can be used without adding any extra hardware sensors, signals, or memory addresses and detecting codes.

In one preferred embodiment, two different laser printheads can be installed having different characteristics, such as their motor speeds being at different rotational velocities, different numbers of facets on their polygonal mirrors, different ramp-up times, and where they ultimately produce a different HSYNC frequency when they achieve their lock frequency. The divide-by-n counter can be used in which n=2, thereby leading to a relatively short HSYNC interval, or can be set to n=8, thereby providing a much longer HSYNC interval. Since it is preferred to interrupt the microprocessor at each output pulse from the divide-by-n counter, the longer the interval between such output pulses, the less busy this modified HSYNC signal keeps the ASIC of the print engine, and the microprocessor of the printer.

In the preferred embodiment, a capture counter is enabled within one of the registers of the microprocessor, and at each HSYNC interrupt, the count is saved. This count is compared to the count that was saved at the previous interrupt, and the resulting numeric difference is proportional to the amount of time between these interrupts. It is important to allow the HSYNC interrupts at the expected lock frequency to occur frequently enough so that the capture counter does not wrap around more than once, since if that were to happen without using a second counter to keep track of that parameter, then the comparison between counts would become useless information.

In the preferred embodiment, the divide-by-n counter is performed within the ASIC circuit of the print engine. Of course, other types of hardware dividers could be used without departing from the principles of the present invention. In addition, other signals that are proportional to the scanning speed of the laser across the electrostatic drum could be used without departing from the principles of the present invention. Furthermore, other types of timing devices could be used besides a capture counter within the microprocessor of the printer without departing from the principles of the present invention.

One major advantage of using the HSYNC signal is that this signal is always available when the printhead is running, even when no pages are currently being printed. Using this HSYNC signal along with a "lock" signal that is derived at the motor that turns the polygonal faceted mirror allows the printer system of the present invention to be implemented without adding any extra hardware to an earlier version laser printer circuit. This results in a hardware cost savings, and only new software programming code need be added to the microprocessor and ASIC within the laser printer.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
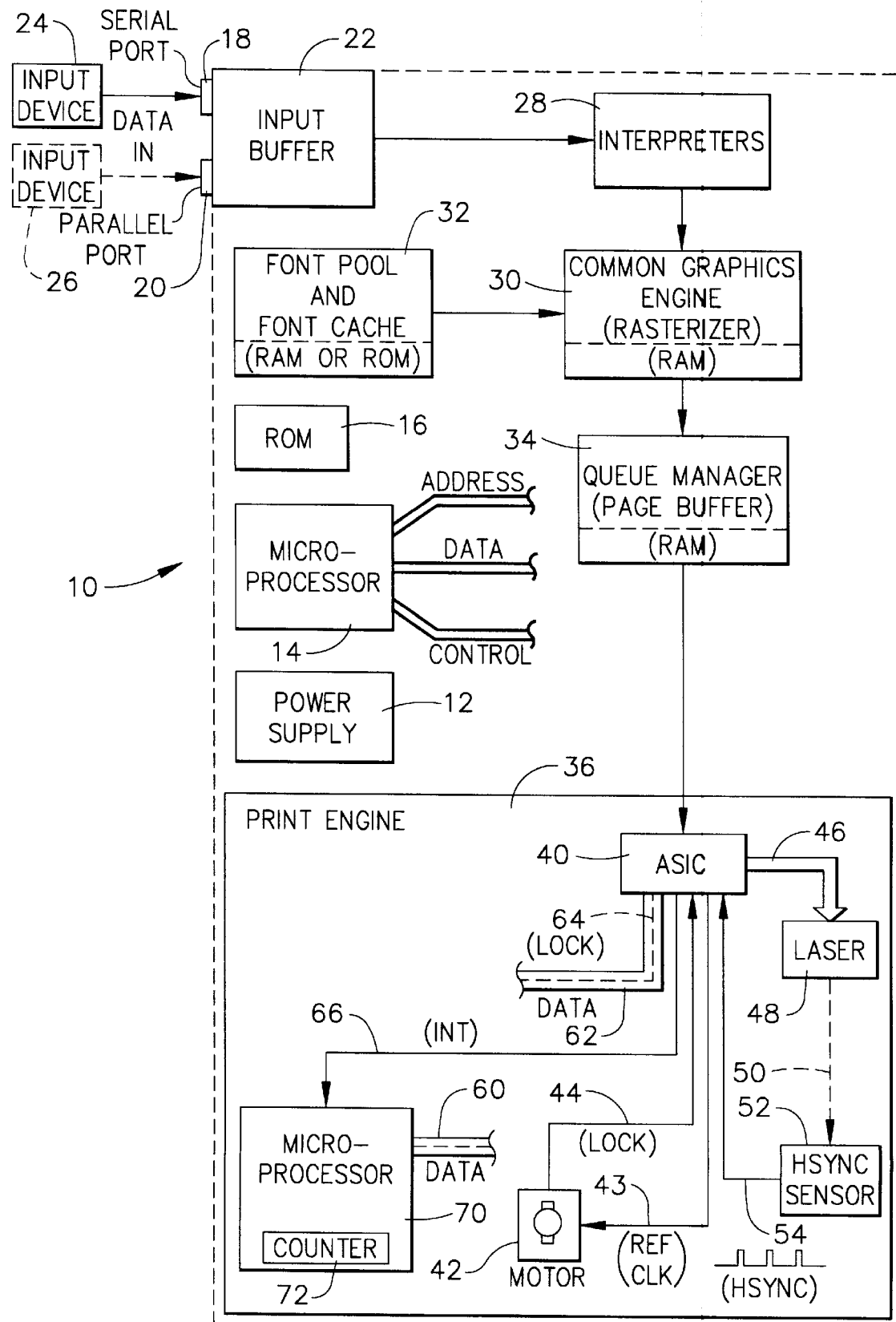
FIG. 1 is a hardware block diagram of the major components used in a laser printer, constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided into several portions for performing several different functions.

Laser printer 10 will typically contain at least one serial input or parallel input port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could also be connected to a parallel output port of the same type of personal computer or workstation containing the same type of programs, only the data cable would have several parallel lines, instead of only a pair of wires that makes up many serial cables. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM designated by the reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36. Print engine 36 includes the laser light source within the printhead, and its output is the physical inking onto a piece of paper, which is the final print output from laser printer 10.

It will be understood that the address, data, and control lines are typically grouped in buses, and which are physically communicated in parallel (sometimes also multiplexed) electrically conductive pathways around the various electronic components within laser printer 10. For example, the address and data buses are typically sent to all ROM and RAM integrated circuits, and the control lines or interrupt lines are typically directed to all input or output integrated circuits that act as buffers.

Print engine 36 contains an ASIC (Application Specific Integrated Circuit) 40, which acts as a controller and data manipulating device for the various hardware components within the print engine. The bitmap print data arriving from Queue Manager 34 is received by ASIC 40, and at the proper moments is sent via signal lines 46 to the laser, which is designated by the reference numeral 48.

ASIC 40 controls the various motor drives within the print engine 36, and also receives status signals from the various hardware components of the print engine. For the purposes of the present invention, there are two important signals received by ASIC 40 that are eventually communicated back to a microprocessor 70 in the print engine. A motor 42 is used to drive the faceted mirror (see the polygonal mirror 116 on FIG. 2), and when motor 42 ramps up to a rotational speed (i.e., its "lock" speed) that is dictated by the frequency of a reference signal ("REF CLK") at a signal line 43, a "Lock" signal will be enabled on a signal line 44 that is transmitted to ASIC 40. In the preferred embodiment, the common frequency for REF CLK is 2002 Hz, which is typically used only during the printhead model determination phase of the printer's operations.

Once ASIC 40 receives the Lock signal from motor 42, it transmits a corresponding Lock Status signal (as part of a byte of a digital signal) along one of the data lines 64 of the data bus 62 that communicates with ASIC 40. Data bus 62 is either the same as the data bus 60 that communicates with microprocessor 70, or a portion thereof. Once microprocessor 70 has this LOCK signal information, it will then perform certain operations to determine which type of laser printhead 48 has been installed within the printer 10, as is more fully described with reference to FIG. 3, hereinbelow.

Another important signal received by ASIC 40 is known as the HSYNC signal, which is received from an optical sensor designated by the index number 52 and called the HSYNC sensor. The laser light source 110 (see FIG. 2) places a spot of light on the rotating polygonal mirror 116, which then redirects the laser light so that it ultimately sweeps or "scans" across a "writing line" on a photoconductive drum, thereby creating a raster line of either black or white print elements (also known as "pels"). As the laser light scans to create this raster line, the laser light momentarily sweeps across HSYNC sensor 52 at the beginning of each sweep or "scan" across one of the facets of polygonal mirror 16. The laser light travels from laser 110 to the HSYNC sensor 52 along a light path, designated diagrammatically by the reference numeral 50 on FIG. 1. This produces an electrical pulse output signal from HSYNC sensor 52, which is communicated to ASIC 40 by a signal line 54. HSYNC signal 54 could be immediately directed to microprocessor 70, however, it is preferred to use a "divide-by-n" counter (not shown) within ASIC 40, to reduce the frequency of pulses leaving ASIC 40 along a control line 66, before arriving at microprocessor 70. In one exemplary embodiment, the value for "n" was set to two (2), thereby providing an output pulse from ASIC 40 upon every other input pulse received along signal line 54. It is preferred, however, in the divide-by-n counter to set the value for "n" to eight (8), thereby dividing HSYNC sensor output signal frequency by eight (8) before that signal is translated into an interrupt signal on control line 66, which will be used to interrupt the microprocessor's operations at a much less frequent time interval.

As related above, a "capture" counter, designated by the reference numeral 72, is allowed to operate within microprocessor 70 in a free running mode, and its value is saved every time an interrupt is received over the control line 66. By use of the different values of the count taken at each interrupt, microprocessor 70 can determine the frequency of HSYNC signal, which is used to determine which laser printhead 100 has been installed in the printer 10.

It will be understood that the REF CLK signal 43 is used to control the rotational speed of motor 42 for operating conditions other than for determining which model of printhead has been installed. In printers having more than one resolution specification (in dpi), the REF CLK signal will likely operate at two different frequencies to obtain the two different resolutions. For printers having only a single resolution specification, there may be no particular need to supply a signal such as REF CLK from the ASIC to the motor, since the motor can be allowed to run at a single rotational speed for all of its intended operations in the printer. In that circumstance, the printhead determination phase could be designed to look at other parameters than the HSYNC frequency, or the ratio of the reference signal and the motor's rotational speed, without departing from the principles of the present invention.

It will also be understood that, during the "printhead determination phase" in Is which the rotational speed of motor 42 is "locked" to the REF CLK signal 43 at the common 2002 Hz frequency, then either one or both of two conditions must exist for there to be a difference in HSYNC frequencies between the various printhead models that can be installed in the printer: (1) the ratio of motor rotational speed in RPM to the REF CLK "lock" frequency must be different from one another; and (2) the number of facets of the rotating mirror 116 (see FIG. 2) must be different between printhead models if the ratio of motor rotational speed in RPM to the REF CLK "lock" frequency is not different from one another.

Figure 2:
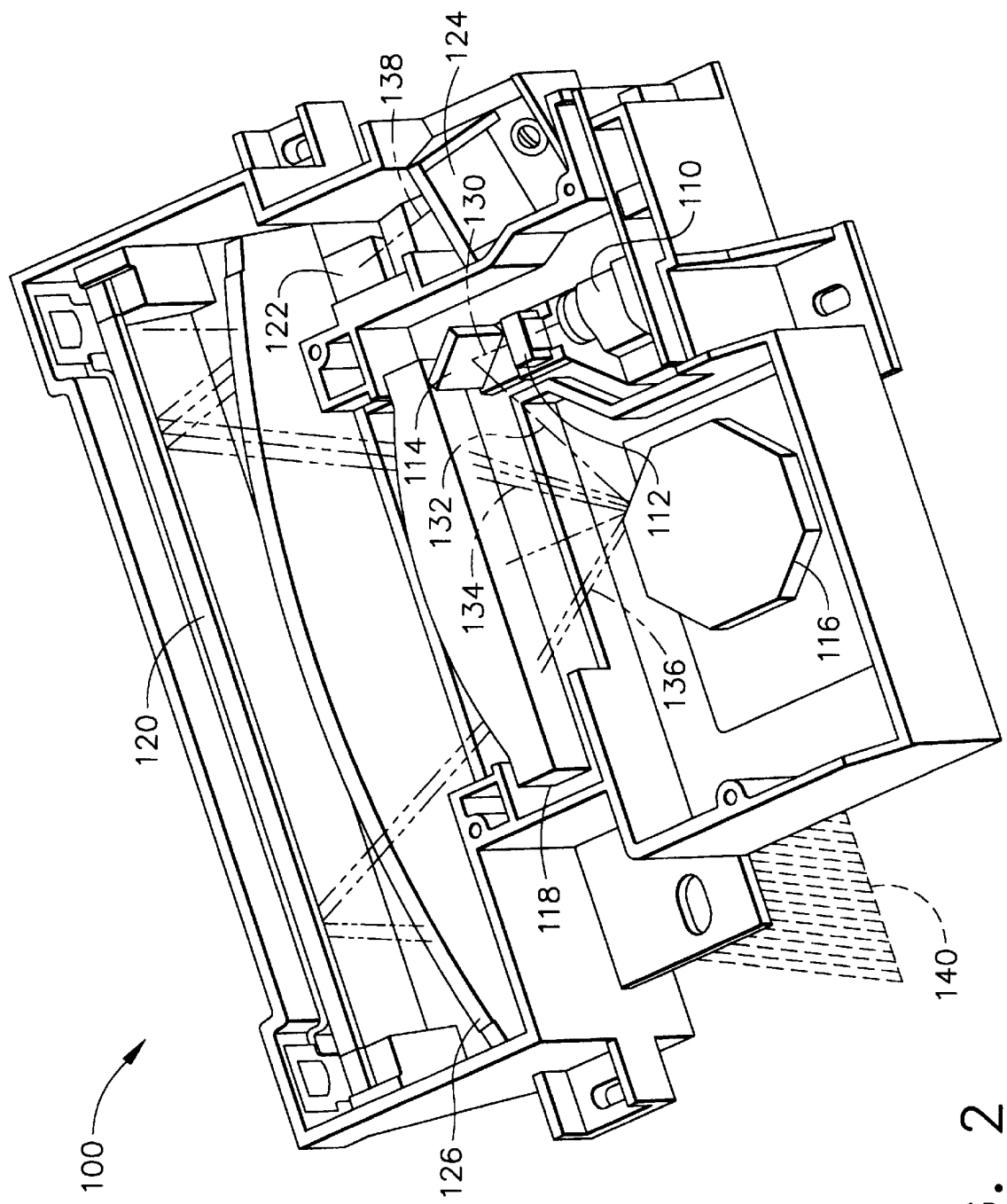
FIG. 2 is perspective view in partial cut-away of a laser printhead particularly showing the details of the light pathways from the laser to the HSYNC sensor card.

FIG. 2 provides a perspective partially cut-away view of some of the major components of a printhead 100 of laser printer 10. Starting at the laser light source 110, the light travels through a lens 112 along a pathway 130 and is redirected by a "pre-scan" mirror 114. The redirected light path, designated by a reference numeral 132, puts a spot of light on an eight-sided polygonal mirror 116. Some of the other major optical components within laser printer 10 include a lens 118, a "post-scan" fold mirror 120, a "start of scan" mirror 122, an optical sensor mounted to an HSYNC sensor card 124, and another lens 126 that directs the light into a "writing line" designated by the reference After the laser light leaves the laser source 110, it is focused by lens 112 into a narrow beam that follows light path 130, before arriving at the pre-scan mirror 114. This mirror redirects the light into a path 132 which strikes a spot on the polygonal mirror 116. As mirror 116 rotates (due to motor 42), the reflected laser light is swept by one of the facets of mirror 116 from a starting position for each raster scan at the reference numeral 134, to an ending position of the raster scan at the reference numeral 136. The ultimate goal is to sweep the laser light across a photoconductive drum (not shown), thereby creating a series of parallel light paths as a "writing line" and designated by reference numeral 140. To achieve this writing line 140, the swept laser light is directed through lens 118 and reflected in a downward direction (preferably by 90 degrees) by the fold mirror 120. The final lens 126 is used to provide the final aiming of the swept light that creates writing line 140.

A portion of the swept light that creates each raster scan is aimed by the polygonal mirror 116, lens 118, fold mirror 120, and a "start of scan" mirror 122 to create a light signal that follows the path designated by the reference numeral 138. Light that ultimately travels along path 138 will be directed to impact an optical sensor on the HSYNC sensor card 124, and the optical sensor is equivalent to the HSYNC sensor 52, seen on FIG. 1. In FIG. 2 since there are eight (8) facets or sides to polygonal mirror 116, each one-eighth rotation of mirror 116 will create an entire swept raster scan of laser light that ultimately becomes the writing line 140. For a small instant at the start of each of these scans, there will be a light beam that travels along path 138 to impact the HSYNC sensor 52 on the HSYNC sensor card 124. This HSYNC signal will be created during each scan at all times during normal operation of laser printer 10 when the printhead is running, even during scans in which there are no pels to be printed on the photoconductive drum. Laser source 110 is controlled such that it will produce no light at all for raster lines that are to be left blank on the final printed page, except for a brief moment at the end of each scan, so that the HSYNC signal will be produced at the beginning of each successive scan.

As related above, the ASIC 40 includes a 5-bit divide-by-n counter (not shown) that reduces the frequency of interrupts that arrive at microprocessor 70 along control line 66. Microprocessor 70 includes a 16-bit capture register that acts as a counter 72, having a programmable clocking rate. Counter 72 is enabled to count when the microprocessor 70 receives an interrupt on line 66, which preferably occurs once every eight HSYNC pulses from the data line 54. The count output from counter 72 is "captured" and thereby effectively measures the time (which is proportional to the count value) between successive interrupt signals arriving on control line 66.

As the capture counter 72 accumulates a count, it is important that the counter not be allowed to wrap around more than one complete time before the next interrupt occurs, thereby preserving its output count value before a second wrap-around occurs. Otherwise, the counter would wrap around and "overflow" before the microprocessor had a chance to save its count upon receiving the next interrupt.

In some of the newer laser printers available from Lexmark International, Inc., the printing speed in pages per minute (PPM) can be adjusted by the user. For example, in the OPTRA® series of laser printers, one model can print at a true 1200 dots per inch (dpi) at eight (8) PPM, or can print at a 1200 dpi "image quality" or at a true 600 dpi resolution at twelve (12) PPM. In another OPTRA laser printer model, the user can select from between twelve (12) PPM at a true 1200 dpi or twenty-four (24) PPM at 600 dpi. In the higher-speed OPTRA laser printer, more than one printhead model can be used, so long as the printer knows which exact model has been installed. The two different compatible laser printheads have motors that operate at different rotational speeds, and also use polygonal mirrors that have different numbers of facets. Furthermore, the two different laser printheads have different specifications for ramp-up time, and for their distance between the HSYNC sensor location and the first pel on the printed page.

When the laser printhead is first energized, its motor 42 will require several seconds to "ramp-up" to the rotational speed dictated by the REF CLK signal 43. Once the rotational speed corresponding to the reference frequency has been achieved, the printer system can now sample the actual rotational speed to make a determination as to which laser printhead has actually been installed in this particular printer. As related above, there will be an HSYNC pulse output signal 54 provided to the ASIC 40 every time the laser printhead makes a scan. During ramp-up, the laser is typically turned off to preserve the life expectancy of the photoconductive drum, however, the laser is allowed to turn on during each scan for the brief moment that its light will be aimed at the HSYNC sensor 52.

Once the rotational speed corresponding to the lock frequency is achieved, the laser power is adjusted by turning on the laser prior to the moment during each scan that the light is aimed at the HSYNC sensor. Since this generates an HSYNC pulse per scan or sweep by the laser, via the faceted mirror 116, ASIC 40 can start generating interrupts along signal line 66, which will be noticed by microprocessor 70. So long as the expected HSYNC frequency between the two different printhead models are in different ranges, the circuitry and operating software of the present invention can be used to automatically determine which model laser printhead is, in fact, installed. For example, using an interrupt signal that responds to every second ASIC pulse at signal 54, in one printhead the expected range for HSYNC time interval is 363–386 microseconds, and in the other printhead the expected HSYNC time interval will be in the range of 323–343 microseconds. The exact timing can be determined from the count difference between the two time intervals that the interrupts occurred at microprocessor 70, based upon the capture-counter's outputs.

Figure 3:
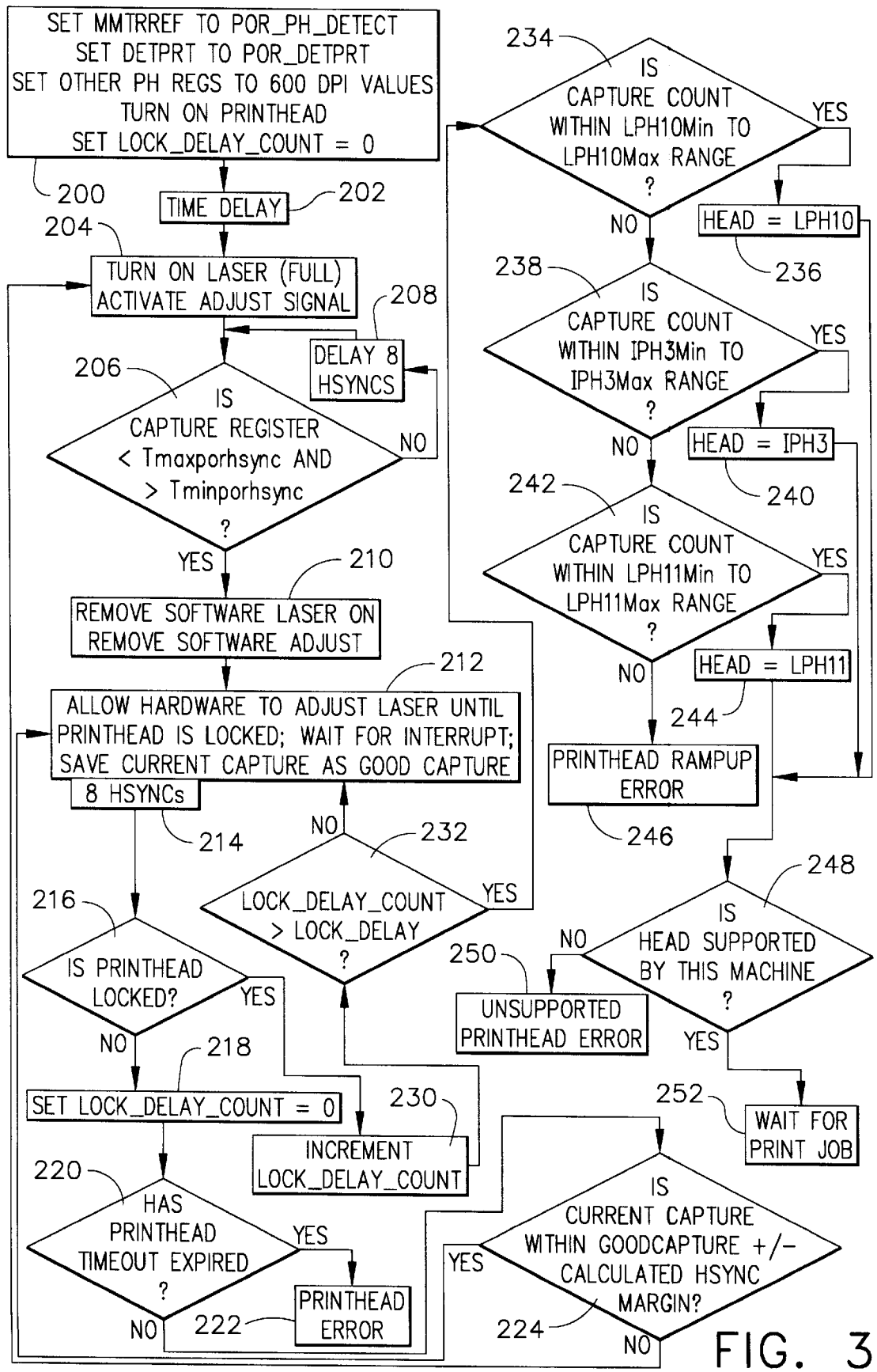
FIG. 3 is a flow chart depicting the logical steps taken to determine which particular laser head has been installed in the laser printer of FIG. 1.

FIG. 3 is a flow chart of the important logical operations performed to determine which laser printhead has been installed in an exemplary OPTRA laser printer, according to the principles of the present invention. Starting at a function block 200, certain variables are initialized as follows: the mirror motor reference frequency, designated "MMTRREF," is set to a common reference frequency used to identify the printhead; a variable "DETPRT" is used to set the distance in pels between the HSYNC photosensor and the first pel on the printed page, and initialized; other printhead registers used in the ASIC control are set to 600 dpi values in this example.

After these variables are initialized, the printhead is turned on, and a variable named "Lock_Delay_Count" is set equal to zero (0). This variable acts as a "filter" so that the initial false reading of these other variables when the motor is first turned on is ignored. In many printheads, when the motor is first turned on, its "Lock" signal is immediately enabled for a short time period, thereby outputting a signal that otherwise would have one believe that the motor is already at its locked running speed. This variable is used to determine if the Lock signal has been turned on for over one-half second, which means that a true "lock" condition exists.

The logic flow now arrives a function block 202 which provides a time delay before the logic flow is directed to the next function block 204. This time delay ensures that the printhead is at sufficient rotational speed so as to not overflow the capture counter. At function block 204, the laser light source is turned on to its full intensity, and the power adjust circuitry is activated to bring the laser beam to its proper intensity for actual printing. At this stage of operation, a photodiode detects the laser light (at one point in time per scan), and the output signal from this photodiode is used as a feedback signal to adjust the laser brightness.

The logic flow now arrives at a decision block 206 where the capture counter (see counter 72 on FIG. 1) is tested to be sure that the HSYNC pulses are arriving quickly enough to prevent the ASIC laser-positioning registers from overflowing. On the flow chart of FIG. 3, the capture counter is given the variable name "Capture Register," and its values are tested to be sure they are within a certain range of counts. If the result at decision block 206 is NO, the logic flow is directed to a function block 208 which provides a time delay, waiting for another interval which could be as short as one (1) HSYNC pulse, or as many as thirty-two (32) such pulses. In the illustrated embodiment of FIG. 3, this delay is set to eight (8) HSYNC pulses. The logic flow is now directed back to decision 206.

Once the result at decision block 206 becomes YES, the logic flow is directed to a function block 210 that turns the laser off during the portion of the scans where its beam would impact the drum, however it leaves the laser on at the portion of the scan where the laser beam strikes the HSYNC sensor. It is, of course, desirable to arrive at this stage very quickly, so that the laser will not be continually sending light beams onto the photoconductive drum unnecessarily.

The logic flow now arrives at function block 212 in which the light intensity hardware circuitry is used to adjust the laser until the printhead is operating in a "locked" condition. Once that occurs, the logic waits for the next interrupt (which will be due to a certain number of HSYNC pulse occurrences), after which the next immediate "capture" (i.e., the value at the Capture Register) will be considered a "good" capture. Once a "good" capture for the capture counter 72 occurs, the logic flow is directed to a function block 214 that waits for the next interrupt, which occurs after eight (8) more arrivals of HSYNC output pulses. The logic flow is then directed to a decision block 216.

Decision block 216 determines whether or not the printhead is already locked. If not, the logic flow is directed to a function block 218 that sets the value to zero (0) for the variable "Lock_Delay_Count." By setting this variable's value to zero (0), the system will essentially filter out false readings that may temporarily exist in some of the signals, such as can occur in the Lock signal. The logic flow now arrives at a decision block 220, which determines whether or not the printhead timeout period has expired, which essentially is waiting for the printhead to ramp-up. If the answer is YES, the logic flow is directed to a function block 222 which declares that there has been an "Error," and the printer will not be able to function normally. If the answer is NO at decision block 220, the logic flow is directed to a decision block 224 that compares the most recent value of the capture counter 72, (i.e., the "Current Capture" value) with the value in the variable "Good Capture."

If the most recent value related to the capture counter 72 is within a certain percentage of the expected HSYNC value, then decision block 224 will provide a YES answer. In that event, the logic flow will travel back to function block 212, which adjusts the laser until the printhead is locked. In making this determination, it is preferred to use a margin of ±4% as the allowable percentage that will be considered as being within the acceptable margin for the difference between these two counter values.

If the result at decision block 224 is NO, then the logic flow is directed back to function block 224, which essentially turns on the laser and begins or continues the adjustment process.

If the result at decision block 216 is YES, then the printhead is now locked and the logic flow is directed to a function block 230 that increments the value for the variable "Lock_Delay_Count." The logic flow is then directed to a decision block 232, where it is determined whether or not the current value for the variable "Lock_Delay_Count" is greater than a pre-determined value called "LOCK_DELAY." If the answer at decision block 232 is NO, then the logic flow travels back to function block 212 where the laser continues to be adjusted until the printhead is locked. The value for the variable LOCK_DELAY is set to an appropriate number so that the incremental loop involving operational blocks 212, 214, 216, 230, and 232 provides approximately a one-half second time delay.

If the result at decision block 232 is YES, the logic flow is directed to a decision block 234 where the variable "Capture Count" is inspected to determine if it is within a certain range, such as for example from 969 microseconds to 1,029 microseconds, that would indicate that a printhead model LPH10 has been installed in laser printer 10. The variable Capture Count represents the difference between the two most recent values for the capture counter 72, and is proportional to the time interval between interrupts at the signal line 66 for microprocessor 70.

If the answer at decision block 234 is YES, then the logic flow travels to a function block 236 that sets all of the important signals and other variables and parameters for use with the type "LPH10" printhead. The logic flow then travels to a decision block 248 that determines whether or not this particular model or style of laser printhead is of a type that is supported by this particular model of printer. If the answer is YES, then the logic flow travels to a function block 252 where the system waits for the data for the next print job to arrive. In that circumstance, it can be presumed that, for the purposes of the present invention, the laser printhead is in good operating order, and the proper interfacing signals and variables will be used for the model LPH10 printhead.

If the result at decision block 234 was NO, then the logic flow is directed to a decision block 238 that determines if the variable Capture Count is within the range, such as for example from 363 microseconds to 386 microseconds, for a model "IPH3" printhead. If the answer is YES, the logic flow is directed to a function block 240, that sets all the important signals and other variables and parameters for use with that style printhead. The logic flow is then directed to decision block 248 that determines whether or not this printhead model IPH3 is of a type supported by this particular printer. If the answer is YES, the logic flow is directed to function block 252 to await the arrival of the next print job.

If the result at function block 238 was NO, the logic flow is directed to a decision block 242 that determines whether or not the variable Capture Count is within the proper limits, such as for example from 323 microseconds to 343 microseconds, for the model "LPH11" printhead. If the answer is YES, then the logic flow travels to a function block 244 where all of the signals and other variables and operating parameters in the printer are set for that style printhead. The logic flow is then directed to decision 248 to determine whether or not this particular printer supports the model LPH11 printhead. If the answer is YES, the logic flow is directed to function block 252 and waits for data of the next print job.

If the result at decision block 248 was NO for any of the above three printheads, then the logic flow is directed to a function block 250 that announces an "error" for the reason that this particular printer does not support the model of printhead that was found in the earlier portions of this flow chart. When that occurs, it is obvious that the printer cannot continue to assume that it can successfully operate.

If the result at decision block 242 was NO the logic flow is directed to a function block 246 that announces an "error" in the printhead ramp-up procedures. When this occurs, the printer similarly cannot continue to assume that it may operate normally.

The flow chart in FIG. 3 illustrates a situation where the same control logic can be used for more than one model of a printer within a family of laser printers. In other words, the same operating software and hardware signals can be used as depicted in FIG. 3 for a relatively slow printer having, for example, a rate of eight (8) PPM to twelve (12) PPM, as can be used for one of the faster printers having a rate in the range of twelve (12) PPM to twenty-four (24) PPM. This feature illustrates the reason for decision block 248, which determines whether or not a particular installed printhead is supported by this particular printer. If a relatively slow printhead was installed, it may well be correct for some models in this particular family of printers, but it may not be at all correct for one of the faster printers.

In the situation where more than one printhead will operate in a single printer model, then of course it is still important to determine which actual printhead has been installed in that printer. For example, both model printheads IPH3 and LPH11 will both work in a very fast printer model having a rate of twelve (12) PPM to twenty-four (24) PPM. For this printer, either decision block 238 or 242 should provide a YES result.

It will be understood that the precise method and apparatus that is disclosed hereinabove for determining which printhead has been installed in a printer could be significantly modified without departing from the principles of the present invention. Certainly other various types of motors having different rotational velocities, and other types of polygonal mirrors having various numbers of facets could be substituted without changing anything except some of the numeric values in the parameters involving the frequency of the HSYNC signals. Furthermore, the HSYNC sensor itself could be located at the end of each scan rather than at the beginning of each scan without departing from the principles of the present invention.

Generally speaking, other types of signals could be used by adding more hardware to the printer without departing from the principles of the present invention. Using the method disclosed in FIG. 3, the overriding criteria is that there must be some discernible difference between the ranges of expected HSYNC pulse arrival time intervals between each type of printhead model that will be used in a particular family of printers, so that a determination between such printheads can be made automatically. Of course, if additional hardware sensors were installed for measuring other types of physical parameters, then the frequency of HSYNC pulses could be identical for more than one printhead model without defeating the ability to make a determination between such printheads, which design also would be using the principles of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A print engine, comprising: a processing circuit that measures real time, a light source, and an opto-electronic sensor that periodically receives optical energy from said light source, said light source being one of a plurality of light source models that is compatible with said print engine; said opto-electronic sensor generating an electrical output signal each time it receives said periodic optical energy, said periodic electrical output signal being communicated to said processing circuit, and said processing circuit being configured to determine the time interval between successive receptions of said periodic electrical output signal; wherein the length of said time interval being determinative of the model of light source installed within said print engine, and said processing circuit being further configured to automatically determine which of said plurality of light source models that is actually installed within said print engine.

2. The print engine as recited in claim 1, wherein said processing circuit comprises: a microprocessor having an internal counter, an Application Specific Integrated Circuit (ASIC) that receives bitmap print data from an external source, and a plurality of data and control lines running between said microprocessor and ASIC; wherein said ASIC is configured to receive said electrical output signal from said opto-electronic sensor, then to generate an interrupt signal that is transmitted over one of said data and control lines to said microprocessor; said microprocessor being further configured to, upon receiving said interrupt signal, save the present value of said internal counter and to compare the present count value to the immediately preceding saved count value to determine a count interval between successive interrupts received from said ASIC, said count interval being representative of said time interval.

3. The print engine as recited in claim 1, wherein each of said light source models comprises: a laser light source, a rotatable polygonal mirror, and a motor and associated drive circuit that rotates said polygonal mirror; wherein said laser light source emits a beam of laser light that is directed onto said polygonal mirror, said rotating polygonal mirror re-directs said beam of laser light into a plurality of successive scans of moving light beams that create a writing line of light pathways, and said opto-electronic sensor being positioned so as to receive a momentary portion of each said successive scan of moving light beams.

4. The print engine as recited in claim 3, wherein the speed of said motor is related to a periodic reference clock signal having a pre-determined frequency common to all models of said light source.

5. The print engine as recited in claim 4, wherein the ratio of the rotational speed of said polygonal mirror to the frequency of said electrical output signal is different for each of said plurality of light source models.

6. The print engine as recited in claim 3, wherein said processing circuit comprises: a microprocessor having an internal counter, an Application Specific Integrated Circuit (ASIC) that receives bitmap print data from an external source, and a plurality of data and control lines running between said microprocessor and ASIC; wherein said ASIC is configured to receive said electrical output signal from said opto-electronic sensor, then to generate an interrupt signal that is transmitted over one of said data and control lines to said microprocessor; said microprocessor is further configured to, upon receiving said interrupt signal, save the present value of said internal counter and to compare the present count value to the immediately preceding saved count value to determine a count interval between successive interrupts received from said ASIC, said count interval being representative of said time interval and, therefore, determinative of the model of said light source installed within said print engine.

7. The print engine as recited in claim 6, wherein said ASIC contains a "divide-by-n" circuit that causes said interrupt signal to be generated only after receiving "n" number of electrical output signals from said opto-electronic sensor.

8. The print engine as recited in claim 6, wherein said motor ramps up to a "lock" operating condition; said motor and associated drive circuit then outputs a first LOCK electrical signal to said ASIC; and said ASIC then outputs a corresponding second LOCK electrical signal to said microprocessor.

9. The print engine as recited in claim 6, wherein said opto-electronic sensor produces a pulse-mode electrical signal upon each reception of said momentary impulse of optical energy from said successive scan of moving light beams, and said ASIC contains a "divide-by-n" circuit that causes said interrupt signal to be generated only after receiving "n" number of electrical pulses from said opto-electronic sensor.

10. The print engine as recited in claim 3, wherein a number of facets on the polygonal mirror of one of said plurality of light source models is different from a number of facets on the polygonal mirror of another of said plurality of light source models.

11. The print engine as recited in claim 3, wherein said opto-electronic sensor is designated as the "HSYNC" sensor, and receives a momentary impulse of optical energy from said successive scan of moving light beams at one of the beginning and the end of each of said scans.

12. The print engine as recited in claim 11, wherein said HSYNC sensor produces a pulse-mode electrical signal upon each reception of said momentary impulse of optical energy from said successive scan of moving light beams.

13. A method for automatically detecting the model of light source used in a print engine, said method comprising the steps of:

(a) providing a print engine having a processing circuit, an opto-electronic sensor, and a light source, said light source being one of a plurality of models which is compatible with said print engine;

(b) generating a beam of optical energy output by said light source that periodically impacts against said opto-electronic sensor, said opto-electronic sensor generating an electrical output signal each time it receives said periodic optical energy, and communicating said periodic electrical output signal to said processing circuit; and (c) determining the time interval between successive receptions of said periodic electrical output signal at said processing circuit, the value of said time interval being determinative of the model of light source installed within said print engine, and thereby automatically determining which of said plurality of light source models that is actually installed within said print engine.

14. The method as recited in claim 13, wherein the step of determining the time interval between successive receptions of said periodic electrical output signal at said processing circuit comprises: providing a microprocessor having an internal counter, an Application Specific Integrated Circuit (ASIC) that receives bitmap print data from an external source, and a plurality of data and control lines running between said microprocessor and ASIC; receiving said electrical output signal from said opto-electronic sensor, then generating an interrupt signal by said ASIC that is transmitted over one of said data and control lines to said microprocessor; and saving, upon receiving said interrupt signal, the present value of said internal counter and comparing the present count value to the immediately preceding saved count value to determine a count interval between successive interrupts received from said ASIC, said count interval being representative of said time interval.

15. The method as recited in claim 14, wherein the sub-step of determining a count interval between successive interrupts received from said ASIC that is representative of said time interval comprises: comparing said count interval to a pre-determined first upper limit and a pre-determined first lower limit, and if said count interval falls therebetween, determining that said light source comprises a first of said plurality of models which is compatible with said print engine; and if said count interval does not fall therebetween, further comparing said count interval to a pre-determined second upper limit and a pre-determined second lower limit, and if said count interval falls therebetween, determining that said light source comprises a second of said plurality of models which is compatible with said print engine.

16. The method as recited in claim 14, further comprising the step of generating said interrupt signal only after receiving "n" number of electrical output signals from said opto-electronic sensor by use of a "divide-by-n" circuit contained within said ASIC.

17. The method as recited in claim 13, wherein the sub-step of providing a light source comprises: providing a laser light source, a rotatable polygonal mirror, and a motor and associated drive circuit that rotates said polygonal mirror.

18. The method as recited in claim 17, further comprising the steps of: emitting at said laser light source a beam of laser light that is directed onto said polygonal mirror; rotating, via said motor, said polygonal mirror such that said polygonal mirror re-directs said beam of laser light into a plurality of successive scans of moving light beams that creates a writing line of light pathways; and receiving at said opto-electronic sensor a momentary portion of each said successive scan of moving light beams.

19. The method as recited in claim 18, further comprising the steps of: ramping said motor up to a "lock" operating condition; said motor and associated drive circuit then outputting a first LOCK electrical signal to said ASIC; and said ASIC then outputting a corresponding second LOCK electrical signal to said microprocessor.

20. The method as recited in claim 13, further comprising the step of operating said motor at a pre-determined rotational speed based upon a common pre-determined reference frequency, and measuring the frequency of said electrical signal.

21. The method as recited in claim 20, wherein the ratio of the rotational speed of said polygonal mirror to the frequency of said electrical output signal is different for each of said plurality of light source models.

22. The method as recited in claim 13, wherein a number of facets on the polygonal mirror of one of said plurality of light source models is different from a number of facets on the polygonal mirror of another of said plurality of light source models.

23. A print engine, comprising: a processing circuit that measures real time, a light source, and an opto-electronic sensor that periodically receives optical energy from said light source, said light source being one of a plurality of available light source models; said opto-electronic sensor generating an electrical output signal each time it receives said periodic optical energy, said periodic electrical output signal being communicated to said processing circuit, and said processing circuit being configured to determine the time interval between successive receptions of said periodic electrical output signal; wherein the length of said time interval being determinative of the model of light source installed within said print engine, and said processing circuit being further configured to automatically determine if said one of said plurality of available light source models is not compatible with said print engine.

* * * * *